Jan. 9, 1945.   R. P. McMAHON   2,366,920
FISHING REEL
Filed Sept. 18, 1942   2 Sheets-Sheet 2

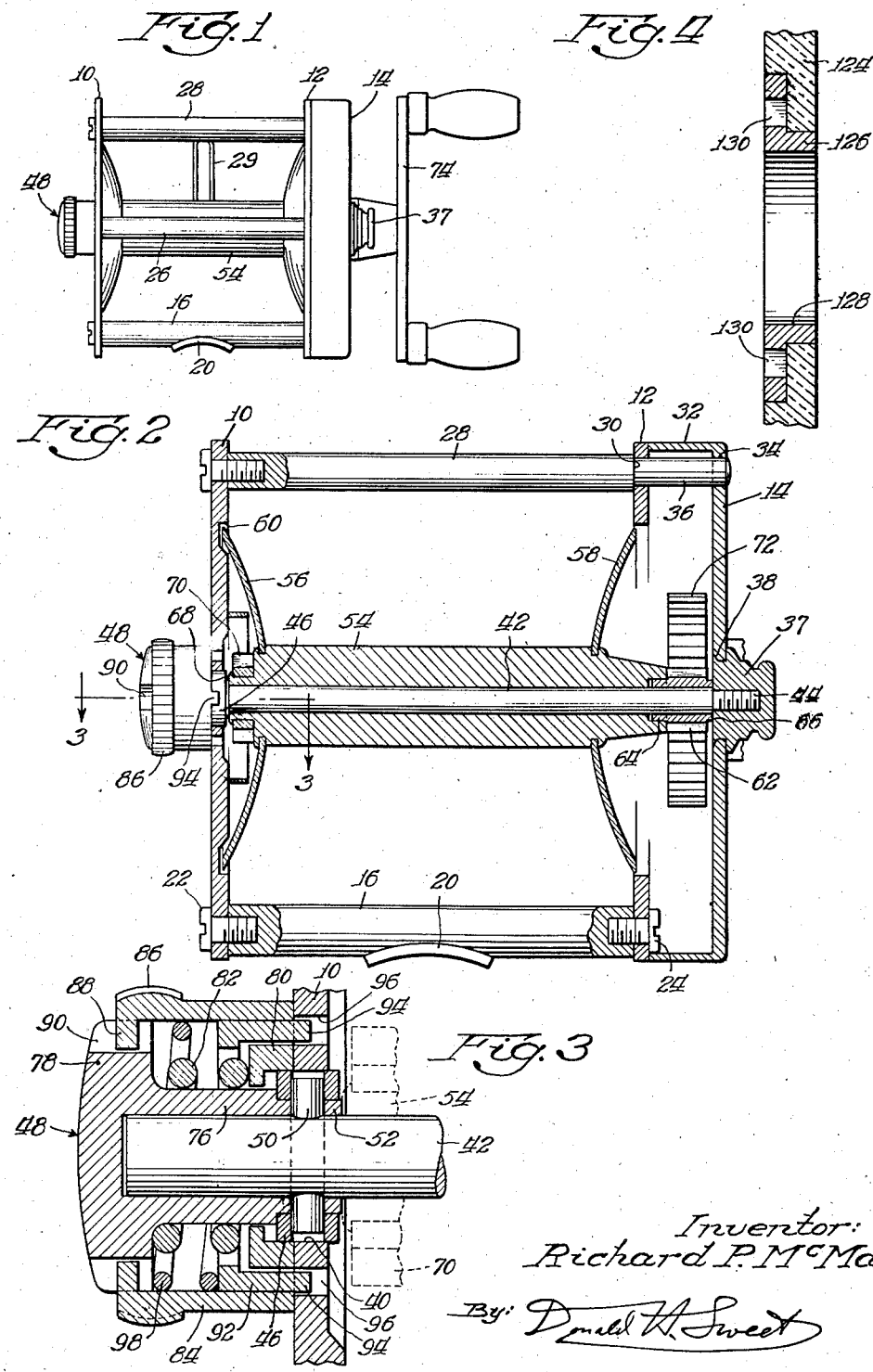

Inventor:
Richard P. McMahon
By Donald H. Swett
Atty.

Patented Jan. 9, 1945

2,366,920

UNITED STATES PATENT OFFICE 2,366,920

FISHING REEL

Richard P. McMahon, Bronson, Mich., assignor to Bronson Reel Company, Bronson, Mich., a corporation of Michigan Application September 18, 1942, Serial No. 458,757

17 Claims. (Cl. 242—84.1)

This invention relates to fishing reels and includes among its objects and advantages the provision of a casting reel of simplified construction, increased durability, and with the parts so arranged as to reduce to a minimum the danger of loss of parts in cleaning and overhauling and the manipulations necessary for disassembly and reassembly.

In the accompanying drawings:

Figure 1 is a rear elevation of a complete reel;

Figure 2 is a central vertical section;

Figure 3 is an enlarged detailed section as on line 3—3 of Figure 2;

Figure 4 is a detail of an alternative locking sleeve;

Figure 5:
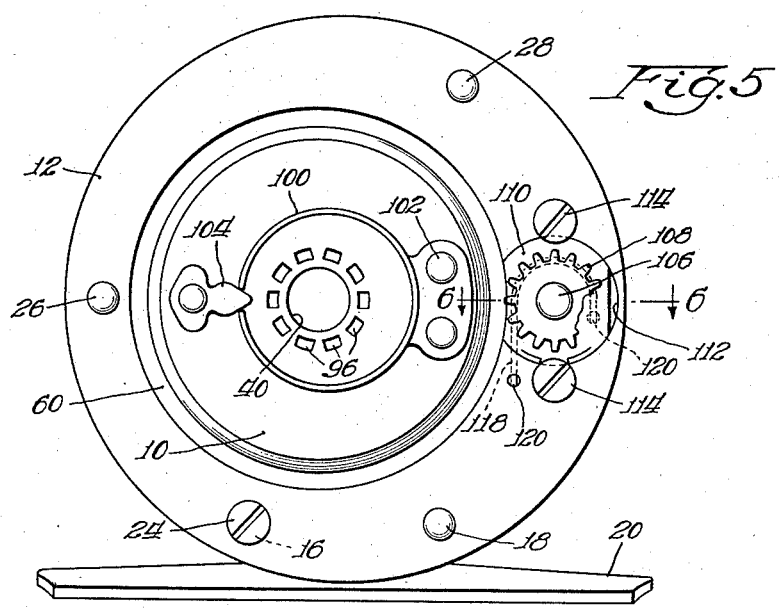
Figure 5 is an end elevation of the frame with the head cap and spool removed.

In the embodiment of the invention selected for illustration the reel comprises a frame including the tail plate 10, the head ring 12, and the head cap 14. Pillars are provided, two of which, 16 and 18, carry the conventional clamping plate 20 for fastening the reel in place on a rod. As clearly indicated in Figures 2 and 5, the pillar 16 is counterbored at both ends to receive fastening screws 22 and 24, which fasten the ends of the pillar to the tail plate 10 and head ring 12 respectively. The two remaining pillars are the rear pillar 26 and the front pillar 28, which latter pillar is slotted to form a guide for the level wind loop 29. The pillars 18, 26, and 28 are all counterbored and fastened with fastening screws to the tail plate 10 but, as indicated in connection with the pillar 28 in Figure 2, they all pass through the head ring 12 and have shoulders as at 30 to form abutments against which the headring may rest.

The head cap 14 is provided with a peripheral flange 32, the edge of which abuts the surface of the head ring 12 along the outer edge of the head ring. And the head cap 14 is apertured at three spaced points as at 34 in Figure 2 to receive the extensions 36 of the pillars 18, 26, and 28. Thus only the screw 24 holds the head ring in the position of Figure 2 when the head cap is removed, and the extensions 36 merely hold the head cap in alignment without preventing its removal.

The head cap is provided with a central female nut 37 integrally assembled therewith as by swaging at 38, and the tail plate 10 is provided with a central aperture 40 in axial alignment with the nut 37. The bolt 42 has a threaded end 44 adapted to enter the nut 37, and at its upper end carries an annulus 46 adapted to slide in the opening 40. The annulus 46 and the main bolt head 48 are integrally assembled on the bolt 42 as by a cross pin 50 driven through a transverse hole, which hole passes through the shaft 42 and the neck 52 of the head 48 and the annulus 46. Rotatably mounted on the shaft 42 is a spool conventionally indicated at 54 having the usual end flanges 56 and 58.

The outer edge of the flange 56 is shrouded in a groove 60 in the tail plate 10, and the outer edge of the end flange 58 nests in the opening in the head ring 12.

The drive pinion 62 is rotatably supported by the shaft 42 and has teeth 64 projecting into recesses in the spool end 54 to transmit the driving force.

It will be apparent that with the parts in the relative position of Figure 2, the end play or axial looseness of the spool in its turning movement is determined by the distance between the face of the nut 37, against which the boss 66 of the pinion 62 may abut, and the neck 52 of the head 48, which will abut against a similar boss 68 at the tail end of the spool, which boss, in this instance, also forms a swaged retaining flange for the click wheel 70.

The gear 72 on the same shaft with the drive crank 74 meshes with the pinion 62 to rotate the spool. As the details of construction of these parts are conventional, this description is not encumbered with further illustration of such details.

The head 48 comprises the neck 52, the body 76, and the end flange 78. Slidable on the body 76 is an annulus 80 adapted to have sliding abutment with the face of the adjacent tail plate 10 and to be forcibly held in abutment with the tail plate 10 by the relatively stiff compression spring 82. Adjustment of the position of the bolt to leave a minimum but sufficient end play for the spool and hold the spring 82 under proper tension, is by screwing the bolt into the nut 37. To regulate and adjust this movement, there is provided an outer sleeve 84 having a knurled peripheral rib 86 at its upper end, and lugs 88 slidable in grooves 90 in the flange 78 to permit the sleeve and head to have relative axial sliding movement but not rotation. To lock the parts in adjusted position, there is provided the annulus 92, which has a press fit in the sleeve 84 and carries two diametrically opposite locking lugs 94 adapted to enter selected diametrically opposite holes in a series of holes 96 surrounding the central guide hole 40 in the tail plate 10. Between the outer end of the sleeve 92 and the opposing face of the flange 78, a relatively light compression spring 98 is provided.

With the reel in the assembled condition illustrated in Figure 2, the user need only pull outwardly on the flange 86 sufficient to compress the spring 98 and then rotate the bolt 42 to unscrew it from the nut 37. As soon as the bolt is disengaged from the nut, it can be withdrawn and the cap 14 can be lifted off and the spool can be lifted out of the frame so that all the parts can be inspected and cleaned or oiled. To reassemble the reel, it is only necessary to place the parts in the relative positions of Figure 2 and screw the bolt back in again. In doing this the user can screw the bolt in until abutment between the bosses 66 and 68 and the parts adjacent causes the spool to bind a little. Then a retrograde movement sufficient to bring the lugs 94 into the locking hole nearest the position where the binding begins to happen will permanently position the parts ready for use with a minimum of end play in the spool, with the spool turning perfectly free.

Referring to Figure 4, there is illustrated a tail plate 124 of Bakelite or composition material in which a metallic annulus 126 is embedded to define a guide opening 128 for the bolt and a series of circumferentially spaced sockets 130 to receive the lugs 94.

Figure 6:
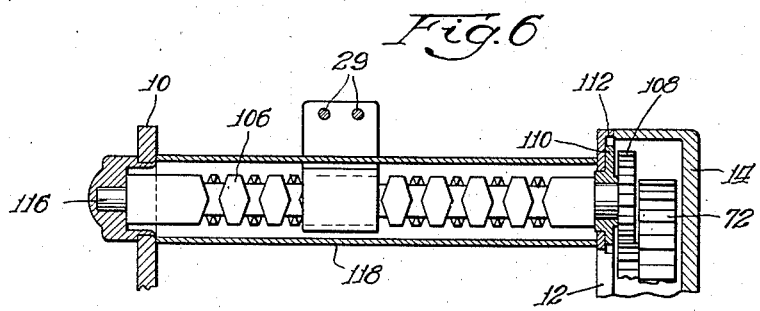
Figure 6 is a section through the level wind mechanism.
Figure 7:
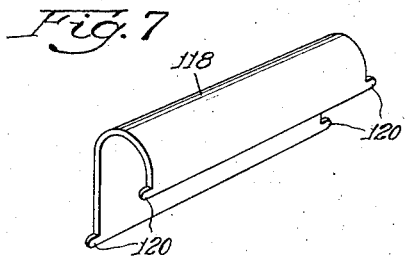
Figure 7 is a detail of the level wind guard.

Referring to Figures 5, 6, and 7, I have illustrated the conventional click means in the nature of a click spring 100 riveted to the tail plate at 102 and cooperating with the movable click point 104.

The level wind mechanism is also conventional, and includes the reversely threaded shaft 106 carrying the integrally assembled pinion 108 with the locking plate 110 rotatable but not axially movable with respect to the shaft and pinion and clamped in suitable recesses 112 in the head ring 12 by fastening screws 114. The tail end of the shaft is reduced to form a bearing portion 116, and the shaft is covered by the guard 118 which is held in place by lugs 120 at its ends entering suitable positioning recesses in the adjacent tail plate and head ring. This level wind mechanism is held in place between the tail plate and head ring but need not itself constitute a tension connection between them. After the parts have been disassembled as previously indicated, removal of the fastening screw 24 will permit the user to lift the head ring 12 off the extensions 36 and the shield 118 will be released while the shaft 106 will remain assembled with the head ring 12.

Without further elaboration the foregoing will so fully explain my invention that others may, by applying knowledge current at the time of application, readily adapt the same for use under various conditions of service.

What is claimed is:

1. A level-wind fishing reel comprising, in combination: a tail member; a head ring; a head cap having a flange shaped for abutment with said head ring; a plurality of pillars each fastened to said tail member and extending across to said head ring; certain of said pillars having extensions of reduced diameter extending through said head ring and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and nut means operatively connected with said tail member for abutment therewith; said nut means including an end flange integral with said bolt and presenting an abutment face facing toward the head cap, an annulus spaced from said end flange and also presenting an abutment face facing toward said head cap; and a bolt spring acting in compression between said flange and annulus, whereby screwing said bolt into said head cap will compress said spring and set up tension in said bolt to hold said head cap in place; a spool journaled on said bolt; a drive pinion at the head end of said spool; said pinion having an annular abutment surface at its head end adapted to abut the adjacent head cap; said spool having an annular abutment surface at its tail end; said bolt having an annular flange adapted to abut said spool abutment, whereby screwing said bolt into said head cap determines the end play of said spool and pinion; locking means for said bolt and its nut means including: a sleeve housing said annulus and compression spring and splined to said end flange; locking projections on said sleeve; receiving means carried by said tail member for receiving said locking projections to hold said sleeve in any one of a plurality of orientations separated by less than 90° of rotation; and a sleeve spring acting in compression and housed in said sleeve outside said bolt spring and abutting said end flange and sleeve to resiliently hold said sleeve with its projections entered in said receiving means; a drive shaft journaled in said head cap on an axis offset from the axis of said bolt and spool; a drive gear on said shaft inside said cap meshing with said spool pinion; a manual operating crank on said shaft outside said head cap; and level wind mechanism including a reversely threaded shaft assembled with said head ring and axially positioned by engagement with said head ring only; a level wind carriage on said shaft; a shield for said shaft; said shield having interlocking abutment means engaging said tank member and head ring to hold it in place; and gearing connecting said level wind shaft and said drive shaft.

2. A fishing reel comprising, in combination: a tail member; a head ring; a head cap having a flange shaped for abutment with said head ring; a plurality of pillars each fastened to said tail member and extending across to said head ring; certain of said pillars having extensions of reduced diameter extending through said head ring and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and nut means operatively connected with said tail member for abutment therewith; said nut means including an end flange integral with said bolt and presenting an abutment face facing toward the head cap; an annulus spaced from said end flange and also presenting an abutment face facing toward said head cap; and a bolt spring acting in compression between said flange and annulus, whereby screwing said bolt into said head cap will compress said spring and set up tension in said bolt to hold said head cap in place; a spool journaled on said bolt; a drive pinion at the head end of said spool; said pinion having an annular abutment surface at its head end adapted to abut the adjacent head cap; said spool having an annular abutment surface at its tail end; said bolt having an annular flange adapted to abut said spool abutment; whereby screwing said bolt into said head cap determines the end play of said spool and pinion; and locking means for said bolt and its nut means including: a sleeve housing said annulus and compression spring and splined to said end flange; locking projections on said sleeve; receiving means carried by said tail member for receiving said locking projections to hold said sleeve in any one of a plurality of orientations; and a sleeve spring acting in compression and housed in said sleeve and abutting said end flange and sleeve to resiliently hold said sleeve with its projections entered in said receiving means; a drive shaft journaled in said head cap on an axis offset from the axis of said bolt and spool; a drive gear on said shaft inside said cap meshing with said spool pinion; and a manual operating crank on said shaft outside said head cap.

3. A fishing reel comprising, in combination: a tail member; a head ring; a head cap having a flange shaped for abutment with said head ring; a plurality of pillars each fastened to said tail member and extending across to said head ring; certain of said pillars ending at said ring and being fastened thereto; certain of said pillars having extensions of reduced diameter extending through said head ring and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and nut means operatively connected with said tail member for abutment therewith; said nut means including an end flange integral with said bolt and presenting an abutment face facing toward the head cap, an annulus spaced from said end flange and also presenting an abutment face facing toward said head cap, and a bolt spring acting in compression between said flange and annulus, whereby screwing said bolt into said head cap will compress said spring and set up tension in said bolt to hold said head cap in place; a spool journaled on said bolt; a drive pinion at the head end of said spool; said pinion having an annular abutment surface at its head end adapted to abut the adjacent head cap; said spool having an annular abutment surface at its tail end; said bolt having an annular flange adapted to abut said spool abutment; whereby screwing said bolt into said head cap determines the end play of said spool and pinion; locking means for said bolt and its nut means including: a sleeve housing said annulus and compression spring and splined to said end flange; locking projections on said sleeve; receiving means for said tail member for receiving said locking projections to hold said sleeve against rotation; and a sleeve spring resiliently holding said sleeve with its projections entered in said receiving means; a drive shaft journaled in said head cap on an axis offset from the axis of said bolt and spool; a drive gear on said shaft inside said cap meshing with said spool pinion; and a manual operating crank on said shaft outside said head cap.

4. A fishing reel comprising, in combination: a tail member; a head ring; a head cap having a flange shaped for abutment with said head ring; a plurality of pillars each fastened to said tail member and extending across to said head ring; certain of said pillars ending at said ring and being fastened thereto; certain of said pillars having extensions of reduced diameter extending through said head ring and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and nut means operatively connected with said tail member for abutment therewith; said nut means including an end flange integral with said bolt and presenting an abutment face facing toward the head cap, an annulus spaced from said end flange and also presenting an abutment face facing toward said head cap, and a bolt spring between said flange and annulus, whereby screwing said bolt into said head cap will compress said spring and set up tension in said bolt to hold said head cap in place; a spool journaled on said bolt; a drive pinion at the head end of said spool; said pinion having an annular abutment surface at its head end adapted to abut the adjacent head cap; said spool having an annular abutment surface at its tail end; said bolt having an annular flange adapted to abut said spool abutment; whereby screwing said bolt into said head cap determines the end play of said spool and pinion; locking means for said bolt and its nut means; a drive shaft journaled in said head cap on an axis offset from the axis of said bolt and spool; a drive gear on said shaft inside said cap meshing with said spool pinion; and a manual operating crank on said shaft outside said head cap.

5. A fishing reel comprising, in combination: a tail member; a head ring; a head cap having a flange shaped for abutment with said head ring; a plurality of pillars each fastened to said tail member and extending across to said head ring; at least one of said pillars ending at said ring and being fastened thereto; certain of said pillars extending through said head ring and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and nut means operatively connected with said tail member for abutment therewith; said nut means including an end flange integral with said bolt and presenting an abutment face facing toward the head cap, an annulus spaced from said end flange and also presenting an abutment face facing toward said head cap, and a bolt spring between said flange and annulus, whereby screwing said bolt into said head cap will compress said spring and set up tension in said bolt to hold said head cap in place; a spool journaled on said bolt; a drive pinion at the head end of said spool; said pinion having an abutment surface at its head end adapted to abut the adjacent head cap; said spool having an annular abutment surface at its tail end; said bolt having an annular flange adapted to abut said spool abutment; whereby screwing said bolt into said head cap determines the end play of said spool and pinion; a drive shaft journaled in said head cap on an axis offset from the axis of said bolt and spool; a drive gear on said shaft inside said cap meshing with said spool pinion; and a manual operating crank on said shaft outside said head cap.

6. A fishing reel comprising, in combination: a tail member; a head member; a head cap having a flange shaped for abutment within said head member; a plurality of pillars each fastened to said tail member and extending across to said head member; certain of said pillars ending at said head member and being fastened thereto; certain of said pillars having extensions of reduced diameter extending through said head member and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and nut means operatively connected with said tail member for abutment therewith; said nut means including an end flange integral with said bolt and presenting an abutment face facing toward the head cap, an annulus spaced from said end flange and also presenting an abutment face facing toward said head cap, and a compression bolt spring between said flange and annulus, whereby screwing said bolt into said head cap will compress said spring and set up tension in said bolt to hold said head cap in place.

7. A fishing reel comprising, in combination: a tail member; a head member; a head cap shaped for abutment with said head member; a plurality of pillars each fastened to said tail member and extending across to said head member; at least one of said pillars ending at said head member and being fastened thereto; certain of said pillars extending through said head member and beyond the same to form guide pins; said head cap being apertured to receive said guide pins and be held in place thereby, except for longitudinal displacement parallel to said pins; and resilient means for holding said head cap against longitudinal displacement; said resilient means including a center bolt having one end threadedly connected to said head cap; the other end of said bolt extending beyond the plane of said tail member; and resilient means acting on said other end of said shaft to set up tension in said bolt to hold said head cap in place.

8. A fishing reel comprising, in combination: a tail member; a head member; a head cap having a flange shaped for abutment with said head member; a plurality of pillars each fastened to said tail member and extending across to said head member; guide means acting between said cap and head member for holding said head member in place, except for longitudinal displacement parallel to said guide means; and resilient means for holding said head cap against such longitudinal displacement; said resilient means including a center bolt having one end threadedly connected to said head cap, the other end of said bolt extending beyond the plane of said tail member, and resilient means for setting up tension in said bolt; a spool journaled on said bolt; a drive pinion at the head end of said spool; said pinion having an annular abutment surface at its tail end; said bolt having an annular flange adapted to abut said spool abutment, whereby screwing said bolt into said head cap determines the end play of said spool and pinion; locking means for said bolt and its nut means; a drive shaft journaled in said head cap on an axis offset from the axis of said bolt and spool; a drive gear on said shaft inside said cap meshing with said spool pinion; and a manual operating crank on said shaft outside said head cap.

9. A fishing reel comprising, in combination: a tail member; a head member; a head cap; a plurality of pillars each fastened to said tail member and extending across to said head member; a center bolt having one end threadedly connected to said head cap; the other end of said bolt extending beyond the plane of said tail member and having nut means operatively connected with said tail member for abutment therewith; a spool journaled on said bolt; a drive pinion at the head end of said spool; said pinion having an annular abutment surface at its head end adapted to abut the adjacent head cap; said spool having an annular abutment surface at its tail end; said bolt having an annular flange adapted to abut said spool abutment, whereby screwing said bolt into said head cap determines the end play of said spool and pinion; locking means for said bolt and its nut means; and a spool driving transmission housed in said cap.

10. A fishing reel comprising, in combination: a tail member; a head member; a head cap; a plurality of pillars each fastened to said tail member and extending across to said head member; a center bolt having one end threadedly connected to said head cap; the other end of said bolt extending beyond the plane of said tail member, and having nut means operatively connected with said tail member for abutment therewith; locking means for said bolt and its nut means including: a sleeve at the tail end of said bolt and splined to said bolt; locking projections on said sleeve; receiving means carried by said tail member for receiving said locking projections to hold said sleeve against rotation; and a sleeve spring acting in compression and housed in said sleeve to resiliently hold said sleeve with its projections entered in said receiving means; and a spool driving transmission housed in said cap.

11. A fishing reel comprising, in combination: a tail member; a head member; a head cap; pillars connecting said members; guide means for said head cap to hold it in place except for longitudinal displacement; and resilient means for holding said head cap against longitudinal displacement; said resilient means including a center bolt having one end threadedly connected to said head cap, and spring means at the other end of said bolt; a spool journaled on said bolt; and a spool driving transmission housed in said cap.

12. A fishing reel comprising, in combination: a rotatable spool; end members at opposite ends of said spool; a tension member extending along the axis of said spool to interconnect said end members and to rotatably support said spool; guide means other than said tension member and remote from the spool axis, for restraining said end members from relative movement except in translation parallel to the spool axis; said tension member having threaded connection with one of said end members; and a resilient lost-motion abutment connection between said tension member and the other end member.

13. A fishing reel comprising, in combination: a rotatable spool; end members at opposite ends of said spool; a tension member extending along the axis of said spool to interconnect said end members and to rotatably support said spool; guide means other than said tension member for restraining said end members from relative movement except in translation parallel to the spool axis; said tension member having threaded connection with one of said end members; and a resilient lost-motion abutment connection between said tension member and the other end member.

14. A fishing reel comprising, in combination: a frame including a tail member, a head member, a cap member, and pillars parallel to a common axis and interconnecting said members and holding them in position except for axial separation; a rotary spool housed in said frame; an axial bolt supporting said spool and holding said members against axial separation; said bolt at one end thereof, having a screw-threaded connection with one of said members; said bolt having two abutment shoulders at the end remote from said threaded connection; one of said shoulders being rigid and the other being axially movable and resiliently pressed toward said threaded connection; one of said shoulders engaging an adjacent frame member to hold the frame members against axial separation; the other of said shoulders engaging the adjacent end of the spool to limit axial play of the spool on the bolt.

15. A fishing reel comprising, in combination: a frame including a tail member, a head member, a cap member and pillars parallel to a common axis and interconnecting said members and holding them in position except for axial separation; a rotary spool housed in said frame; an axial bolt supporting said spool and holding said members against axial separation; said bolt at one end thereof, having a non-resilient connection with one of said members; said bolt having two abutment shoulders at the end remote from said non-resilient connection; one of said shoulders being rigid and the other being axially movable and resiliently pressed toward said non-resilient connection; said movable shoulder engaging an adjacent frame member to hold the frame members against axial separation; said rigid shoulder engaging the adjacent end of the spool to limit axial play of the spool on the bolt; and adjustment means forming part of said non-resilient connection for varying the axial spacing between said non-resilient connection and said rigid shoulder.

16. A fishing reel comprising, in combination: a frame including a tail member, a head member, a cap member and pillars parallel to a common axis and interconnecting said members and holding them in position except for axial separation; a rotary spool housed in said frame; an axial bolt supporting said spool and holding said members against axial separation; said bolt at one end thereof, having a non-resilient connection with one of said members; said bolt having two abutment shoulders at the end remote from said non-resilient connection; one of said shoulders being rigid and the other being axially movable and resiliently pressed toward said non-resilient connection; said movable shoulder engaging an adjacent frame member to hold the frame members against axial separation; said rigid shoulder engaging the adjacent end of the spool to limit axial play of the spool on the bolt; and adjustment means for varying the axial spacing between said non-resilient connection and said rigid shoulder.

17. A fishing reel comprising, in combination: a frame including a tail member, a head member, and a cap member and pillars parallel to a common axis and interconnecting said members and holding them in position except for axial separation; a rotary spool housed in said frame; an axial bolt supporting said spool and holding said members against axial separation; said bolt at one end thereof, having a non-resilient connection with one of said members; said bolt having two abutment shoulders at the end remote from said non-resilient connection; one of said shoulders being rigid and the other being axially movable and resiliently pressed toward said non-resilient connection; said movable shoulder engaging an adjacent frame member to hold the frame members against axial separation; said rigid shoulder engaging the adjacent end of the spool to limit axial play of the spool on the bolt; and threaded adjustment means for varying the axial spacing between said non-resilient connection and said rigid shoulder.

RICHARD P. McMAHON.